Patented Oct. 27, 1925.

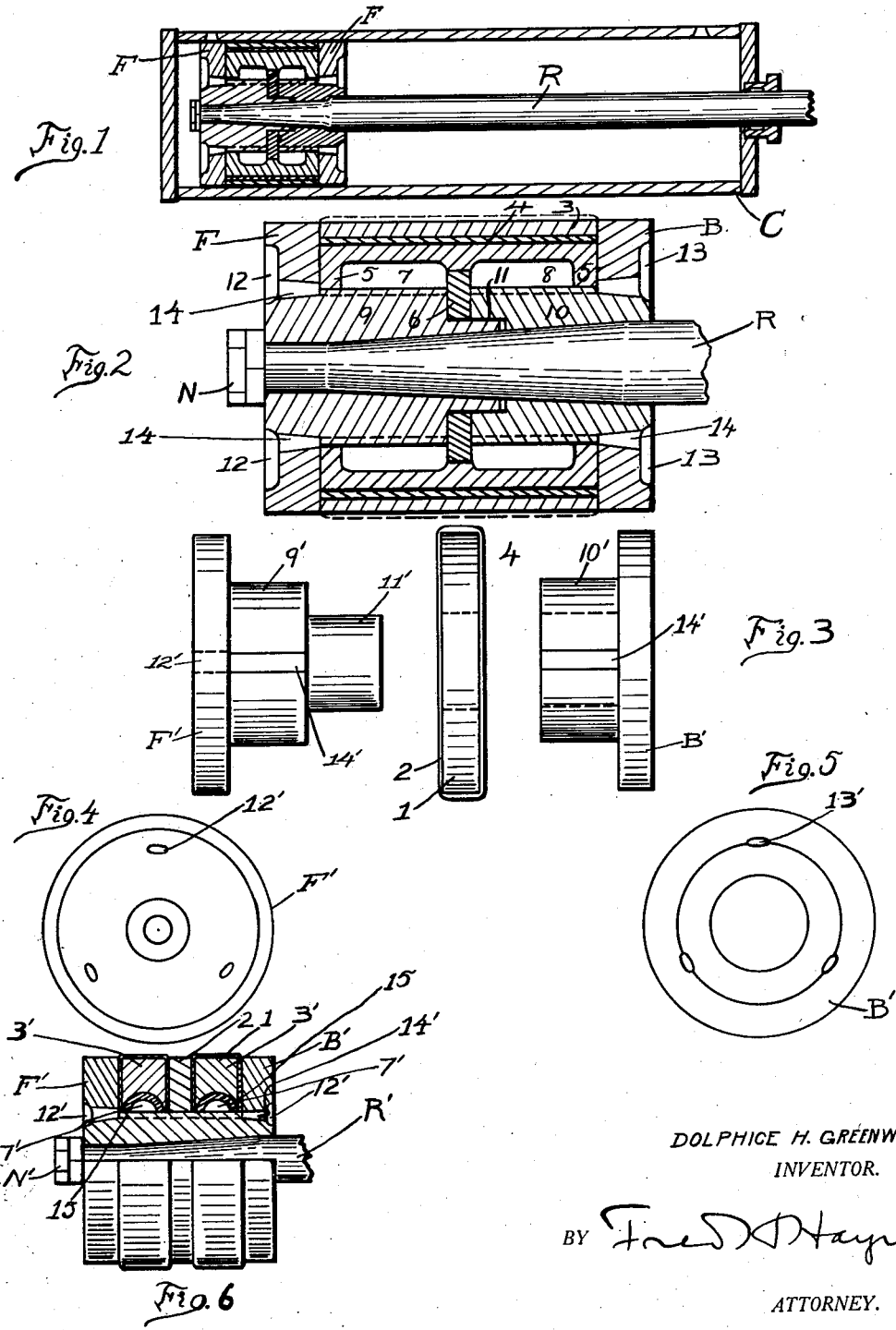

1,558,867

UNITED STATES PATENT OFFICE.

DOLPHICE H. GREENWOOD, OF PASADENA, CALIFORNIA.

PLUNGER.

Application filed March 19, 1925. Serial No. 16,674.

*To all whom it may concern:*

Be it known that I, DOLPHICE H. GREENWOOD, a citizen of the United States, residing at Pasadena, in the county of Los Angeles and State of California, have invented new and useful Improvements in Plungers, of which the following is a specification.

My invention relates to an improvement in pumps, and more particularly in the manner and means, as well as the material, for packing the plunger adapted for use in connection with said pumps, whereby any by-passing of the fluid in said pumps may be effectively prevented, both internally and externally of said plunger.

It accordingly is an object of my invention to provide a novel form of piston in which sets of perforated metallic members have associated therewith sets of intermediate members composed of relatively pliant and rigid portions, certain of said portions being adapted to be bulged or expanded outwardly so as to prevent effectively any fluid from by-passing said metallic members, or said piston, when said piston is assembled.

Another object of my invention is to provide a novel form of piston or plunger adapted for use in a pump in which at least one intermediate member, composed of relatively pliant and rigid material, is adapted effectively to prevent any fluid from by-passing said piston, both externally and internally.

More specifically, it is an object of my invention to equip the plunger of a pump with one or more packing sleeves, preferably cylindrical in form, and composed of an outer relatively pliant portion and sets of relatively pliant and rigid flanges extending from said relatively pliant outer portion, there being an intermediate portion of relatively rigid material positioned between said outer portion and said flanges, all of said portions and flanges being molded together.

It is also an object of my invention to provide my novel form of plunger with a packing member, which, when said plunger is assembled, will be expanded outwardly for fluid sealing purposes, said packing member functioning to provide a frictional grip between the various portions of said plunger to prevent said packing member from contracting as the fluid is removed.

It is also within the province of my invention to provide a packing sleeve composed of relatively pliant and rigid portions, one portion of which is to act as a bull plate of a pump plunger, and which bull plate may be composed either of relatively rigid or pliant material, as is in practice found desirable.

It is also within the province of my invention to provide my improved packing sleeve with one or more hollowed-out portions to receive the fluid entering the piston by means of perforations in the follow and body plates thereof, which hollowed-out portions form a surface against which the fluid pressure acts so as to prevent effectively any fluid from by-passing said sleeve and said plates.

It is moreover within the province of my invention to provide my improved piston with one or more packing members composed of relatively pliant and rigid material, the inner portion of said packing member being provided with a curved portion of relatively rigid material, said packing member being hollowed-out on its inner portion to provide for a fluid pressure engaging surface.

It may also be stated that it is within the province of my invention to use a novel form of bull plate with my improved piston, said bull plate being, if desired, constructed of metal and coated with a comparatively pliant or rigid material, as in practice may suggest itself.

It is also an object of my invention to provide a novel form of device which is simple in character, easy and inexpensive to construct, composed of a minimum number of parts, efficient, durable, and thoroughly effective to perform the objects intended.

Further objects and advantages of my invention will become more apparent as the description thereof proceeds.

Reference is had to the accompanying drawings in which similar reference characters denote similar parts. In the drawings, Fig. 1 is a longitudinal section of a pump cylinder equipped with one form of my invention, Fig. 2 is a similar view on an enlarged scale of the plunger shown in Fig. 1, Fig. 3 is an elevational view of a modified form of plunger, showing the same disassembled, and with the packing sleeves omitted, Fig. 4 is an end elevation of the follow plate, Fig. 5 is a similar view of the body plate, and Fig. 6 is a part sectional and part elevational view of a modified form of my invention.

Describing my invention more in detail, it is the purpose of said invention to provide a piston or plunger adapted for use in any form of pump, which piston or plunger will effectively prevent the fluid in said pump from being by-passed both externally and internally of said piston, and at the same time reduce wear to a minimum, thereby increasing the efficiency of the pump.

As shown in the drawings, F indicates the follow plate or metallic member, which is preferably perforated at 12, and is provided with passages therethrough to communicate with the interior of the piston, so that the fluid may enter the same and its pressure utilized to render the packing members, hereinafter more particularly described, thoroughly effective to prevent any by-passing of said fluid, both within and without said piston.

The body plate or metallic member B is also provided with perforations 13 and passages 14 for the same purpose explained in connection with the member F, which member F has integral therewith, or secured thereto in any desired manner, a cylindrical projection 9, tapered internally as shown, to receive the piston rod R, which has on one end the usual nuts N for securing the various members of the piston in place.

The body plate B has a similar projection 10, also tapered internally, and provided with a bored portion to receive the cylindrical extension 11 associated with the projection 9. The projections 9 and 10 are provided with passages adapted to be placed in alignment with the passages 14 to permit the fluid to enter the interior of the piston.

It will of course be understood that my number of such passages may be provided, and that said passages may be arranged and take any shape desired and still remain within the province of my invention. Further, the exact arrangement and combination of follow and body plates, as well as the projections therefrom and general assembly of the piston may be varied at will.

Positioned between the members F and B is a packing sleeve 3, which packing sleeve has in practise a length slightly greater than the distance between the plates F and B when the piston is assembled, for a purpose presently to be explained. The sleeve 3 is constructed out of portions of pliant and relatively rigid material, which, if desired, may be molded together so as to form one continuous construction.

Preferably, though not necessarily, the sleeve 3 comprises a cylindrical member having an outer portion composed of a pliant material, such, for example, as soft rubber, which outer portion is positioned on an intermediate cylindrical portion 4, preferably composed of a comparatively rigid material, such, for example, as hard rubber of a certain degree of rigidity. Positioned internally of the portion 4 is an inner portion preferably composed of a relatively pliant material, such as soft rubber, and from said inner portion are extended circular flanges 5, and also an intermediate circular flange 6, composed of relatively rigid material, such as hard rubber, all portions, preferably, though not necessarily, being molded together to form one integral structure.

It will be clear that the arrangement of the various portions thus described may be changed as in practise may suggest itself, and certain portions may be made of relatively rigid material, rather than of pliant material as described. For example, if desired, the flange 6, whose shape may be changed, if preferred, may be composed of relatively pliant material rather than rigid.

As shown, the sleeve 3 is hollowed-out internally to define spaces 7 and 8, in which the fluid in the pump is adapted to enter the pressure of which fluid is adapted to act on the flanges 5, as well as on the body of the sleeve 3 to prevent any fluid from by-passing the members F and B, said fluid also assisting to maintain the sleeve 3 in bulged or expanded condition against the cylinder wall of the pump, the flange 6 functioning as a bull plate to prevent the fluid from passing through the piston.

By constructing the packing sleeve 3 of a length slightly longer than the distance between the members F and B, it will be clear that when the piston is assembled, said sleeve will of necessity be bulged or expanded outwardly as shown by the dotted lines in Fig. 2, which feature also provides for a frictional grip between the sleeve and the metallic plates F and b.

In operation, the plunger moving forwardly in the cylinder, the fluid enters the piston through the passages 14 in the follow plate F, and the passages in the projection 9, entering the space 7 and impinging on the flange 5, effectively holding the packing sleeve 3 to the plate F, so that any by-passing of said fluid therebetween may be effectively prevented. On the return stroke of the piston the fluid acts in a similar manner to hold the flange 5 against the body plate B.

In the form shown in Figs. 3 to 6 inclusive, I have shown a modification of the packing sleeve to be used in connection with the novel form of bull plate 1, in practise preferably coated with pliant or relatively rigid material 2 for sealing purposes. As in the preferred form hereinbefore described, the follow plate F' is provided with a projection 9', and an extension 11' adapted to be passed through the bull plate 1. and enter the cylindrical complementary projection 10', integral with or secured to in any desired manner to the body plate B'. The metallic plates thus described are also provided with passages 12' and 14', similar to those shown and described in connection with the preferred form of my invention.

As shown in Fig. 6, the packing sleeve 3' comprises a preferably cylindrical member composed of relatively pliant and rigid material arranged in any desired manner, the inner portion being hollowed out and preferably curved as shown, and composed of a circular strip of comparatively rigid material, the entire sleeve being preferably molded in one integral structure and provided with a space 7' functioning in a manner similar to that of the spaces 7 and 8, the plunger being held in position on the piston rod R' by means of the nuts N'. As explained in connection with the preferred form of my invention, the packing sleeves 3' function precisely as the sleeve 3, and, if desired, any number of such sleeves may be provided.

While I have thus described my invention with great particularity, it is clear that the same may be modified throughout a wide range. I therefore do not propose to be limited to the exact details of construction shown and described, but reserve the right in practise to make any and all modifications thereof that fall within the scope of the appended claims.

I claim as my invention:

1. In a piston, in combination, a set of metallic members, a set of flanged packing members positioned between said metallic members, said packing members being composed of relatively pliant and rigid materials molded together, all of said members being provided with means whereby they may coact effectively to prevent any fluid from by-passing said members when said piston is subjected to fluid pressure.

2. In a plunger, in combination, a set of perforated metallic members, a set of flanged intermediate members associated therewith, said intermediate members being composed of relatively pliant and rigid materials molded together, said intermediate members being so shaped that the pressure of the fluid entering said perforated members will cause said intermediate members to coact with said metallic members to prevent effectively any of said fluid by-passing therebetween.

3. In a plunger, in combination, a perforated follow member, a perforated body member and a flanged intermediate member positioned between both of said members, said intermediate member being composed of relatively rigid and pliant materials molded together, said intermediate member, when said plunger is assembled, being expanded outwardly to form a fluid seal when said plunger is associated with a pump.

4. In a piston, in combination, a follow member, a body member, and a sleeve composed of pliant and rigid materials molded together positioned between both of said members in such a manner that the frictional grip between all of said members will effectively prevent any fluid by-passing said members, said sleeve being equipped with a central flange, substantially as described.

5. In a pump, in combination, a cylinder, a plunger adapted to be reciprocated therein, said plunger comprising a perforated metallic follow member, a perforated metallic body member, and a flanged intermediate member positioned between said members, said intermediate member being formed of relatively rigid and pliant materials molded together, and being provided with means whereby the fluid entering said perforated members will cause said intermediate member to coact with the wall of said cylinder and each of said metallic members to provide a fluid tight seal therebetween.

6. In a pump, in combination, a cylinder, a plunger adapted to be reciprocated in said cylinder, said plunger comprising a set of perforated metallic members, a flanged intermediate member positioned between said metallic members, said intermediate members being constructed of relatively pliant and rigid materials, and means associated with all of said members whereby the relatively pliant portion of said intermediate member may be caused to be bulged outwardly for the purpose set forth.

7. A piston comprising at least two metallic members having positioned therebetween at least one flanged intermediate member constructed of relatively pliant and rigid materials molded together, one of said flanges being positioned centrally of said intermediate member, the pliant portion of said intermediate member being adapted to be bulged outwardly beyond said metallic members for the purpose set forth.

8. A packing sleeve for use in connection with the plunger of a pump, said sleeve comprising outer and inner members of relatively pliant materials, and an intermediate member of relatively rigid material molded together, substantially as described.

9. A packing sleeve adapted to be associated with the plunger of a pump, said sleeve having an outer portion of relatively pliant material, a pair of circular flanges of relatively pliant materials associated with said outer portion, and an inner circular flange of relatively rigid material positioned between said circular flanges.

10. A packing sleeve adapted to be associated with the plunger of a pump, said sleeve having an outer member composed of relatively pliant material, a pair of circular flanges of relatively pliant material extending from said outer member, and a relatively rigid member positioned between said flanges.

11. A cylindrical packing sleeve for use in connection with the plunger of a pump, the external portion of said sleeve being composed of relatively pliant material, an inner portion of relatively rigid material associated with said external portion, a pair of circular flanges of relatively pliant material extending from said inner portion, and an intermediate flange composed of relatively rigid material and extending from said inner portion, said intermediate flange being adapted to function as the bull plate of said plunger to prevent fluid from passing therethrough.

12. In a piston sleeve, the combination of an outer body of pliable wear resisting material, and an inner body of flexible material hollowed out to provide a fluid pressure engaging surface, said inner body having a centrally positioned circular flange projecting therefrom, both of said bodies and said flange being vulcanized together.

13. A piston having a set of perforated metallic members and a packing member of relatively pliant and rigid materials so positioned on said piston and so associated with said metallic members that the fluid entering said perforations will function to act on said packing member effectively to prevent any by-passing of said fluid within said piston, said packing member also effectively preventing any by-passing of the fluid externally of said piston, said packing member having a flange centrally positioned thereon and vulcanized therewith.

14. A packing member comprising an outer pliant portion, an intermediate rigid portion, an inner pliant portion, and sets of flanges of pliant and rigid materials, substantially as described.

In testimony whereof I have signed my name to this specification.

DOLPHICE H. GREENWOOD.